(12) United States Patent
Nyshadham et al.

(10) Patent No.: US 10,990,384 B2
(45) Date of Patent: Apr. 27, 2021

(54) SYSTEM, APPARATUS AND METHOD FOR DYNAMIC UPDATE TO CODE STORED IN A READ-ONLY MEMORY (ROM)

(71) Applicant: Intel Corporation, Santa Clara, CA (US)

(72) Inventors: Phani Kumar Nyshadham, Bangalore (IN); Carsten Bendixen, Aalborg (DK); Peter Kroon, Green Brook, NJ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/144,045

(22) Filed: Sep. 27, 2018

(65) Prior Publication Data

US 2020/0104119 A1 Apr. 2, 2020

(51) Int. Cl.
*G06F 9/44* (2018.01)
*G06F 8/65* (2018.01)
*G06F 9/32* (2018.01)

(52) U.S. Cl.
CPC ........... *G06F 8/66* (2013.01); *G06F 9/321* (2013.01); *G06F 9/328* (2013.01)

(58) Field of Classification Search
None
See application file for complete search history.

(56) References Cited

U.S. PATENT DOCUMENTS

| | | | | |
|---|---|---|---|---|
| 6,260,157 B1* | 7/2001 | Schurecht | ........... | G06F 8/66 711/202 |
| 7,039,776 B2* | 5/2006 | Wong | ........... | G06F 8/60 711/159 |
| 7,454,663 B2* | 11/2008 | Liow | ........... | G06F 1/3203 714/42 |
| 7,596,721 B1* | 9/2009 | Flake | ........... | G06F 8/66 714/42 |
| 7,739,469 B2* | 6/2010 | Jessani | ........... | G06F 9/328 711/103 |
| 7,844,962 B2* | 11/2010 | Alexandre | ........... | G06F 9/30149 711/102 |
| 8,156,486 B2* | 4/2012 | Hsu | ........... | G06F 9/328 717/168 |
| 8,468,516 B1* | 6/2013 | Chen | ........... | G06F 8/656 717/170 |
| 9,348,730 B2* | 5/2016 | Odlivak | ........... | G06F 11/3644 |
| 9,367,482 B2* | 6/2016 | Loisel | ........... | G06F 12/14 |
| 9,471,785 B2* | 10/2016 | Zaidi | ........... | G06F 21/572 |
| 9,880,856 B2* | 1/2018 | Akdemir | ........... | G06F 9/4401 |
| 10,459,715 B2* | 10/2019 | Park | ........... | G06F 3/0679 |
| 2003/0005212 A1* | 1/2003 | Cocca | ........... | G06F 8/60 711/103 |
| 2004/0210720 A1* | 10/2004 | Wong | ........... | G06F 8/60 711/132 |

(Continued)

*Primary Examiner* — Insun Kang
(74) *Attorney, Agent, or Firm* — Trop, Pruner & Hu, P.C.

(57) ABSTRACT

In one embodiment, an apparatus includes: a control circuit to enable a comparison circuit based on a dynamic update to a hook table and a patch table; and the comparison circuit coupled to the control circuit to compare an address of a program counter to at least one address stored in the hook table, and in response to a match between the address of the program counter and the at least one address stored in the hook table, cause a jump from code stored in a read only memory to patch code stored in a patch storage. Other embodiments are described and claimed.

18 Claims, 16 Drawing Sheets

(56) References Cited

U.S. PATENT DOCUMENTS

| | | | | |
|---|---|---|---|---|
| 2006/0107104 A1* | 5/2006 | Alexandre | G06F 9/30149 | 714/6.13 |
| 2007/0174680 A1* | 7/2007 | Su | G06F 8/66 | 714/6.13 |
| 2007/0198787 A1* | 8/2007 | Jessani | G06F 9/32 | 711/159 |
| 2008/0155524 A1* | 6/2008 | Shone | G06F 8/65 | 717/168 |
| 2008/0184072 A1* | 7/2008 | Odlivak | G06F 11/3644 | 714/32 |
| 2009/0013124 A1* | 1/2009 | Itkin | G06F 9/32 | 711/103 |
| 2011/0252413 A1* | 10/2011 | Maeda | G06F 8/66 | 717/168 |
| 2012/0290773 A1* | 11/2012 | Naccache | G06F 8/66 | 711/103 |
| 2014/0149643 A1* | 5/2014 | Devinoy | G06F 8/66 | 711/103 |
| 2014/0244991 A1* | 8/2014 | Akdemir | G06F 8/66 | 713/2 |
| 2014/0283103 A1* | 9/2014 | Loisel | G06F 12/14 | 726/26 |
| 2014/0289455 A1* | 9/2014 | Verhallen | G06F 12/0638 | 711/103 |
| 2015/0301935 A1* | 10/2015 | Kato | G06F 9/30065 | 711/103 |
| 2015/0355900 A1* | 12/2015 | Crosby | G06F 8/654 | 717/168 |
| 2016/0019036 A1* | 1/2016 | Bar-Or | G06F 8/66 | 717/159 |
| 2016/0019054 A1* | 1/2016 | Bar-Or | G06F 8/66 | 717/168 |
| 2016/0359577 A1 | 12/2016 | Bar Bracha et al. | | |
| 2018/0018157 A1* | 1/2018 | Okamoto | G06F 8/66 | |
| 2018/0217834 A1* | 8/2018 | Park | G06F 3/0679 | |
| 2019/0034195 A1* | 1/2019 | Pirvu | G06F 8/72 | |
| 2019/0034196 A1* | 1/2019 | Pirvu | G06F 8/66 | |
| 2019/0129835 A1* | 5/2019 | Hua | G06F 12/0215 | |

* cited by examiner

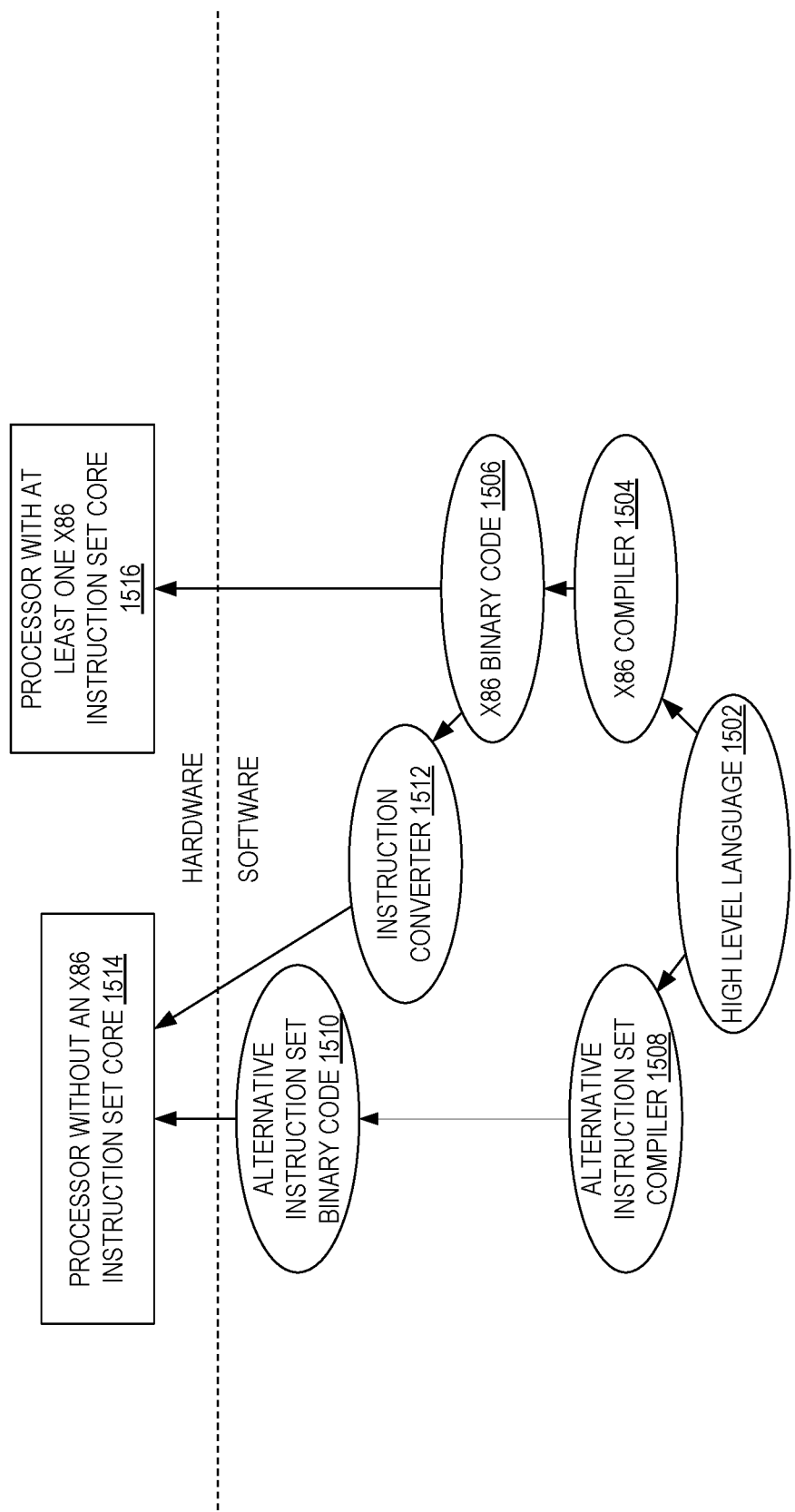

SYSTEM, APPARATUS AND METHOD FOR DYNAMIC UPDATE TO CODE STORED IN A READ-ONLY MEMORY (ROM)

TECHNICAL FIELD

Embodiments relate to electronic devices that execute code stored in a non-volatile storage.

BACKGROUND

In many electronic devices, embedded software or firmware can be stored in either random access memory (RAM) or read-only memory (ROM). Especially when the code is quite stable, ROM is the preferred option because of cost efficiency (smaller chip area) and power efficiency (lower leakage). However, when code is written onto ROM masks, it becomes unchangeable. Updates to be made to code stored in ROM, e.g., due to bug fixes or quality improvements, are typically patched to the ROM using a patch RAM (Patch-RAM).

To enable these potential future ROM updates using PatchRAM, ROM code typically includes software hooks inserted a priori, to jump from ROM code into PatchRAM where code for the bug fix/update is stored. For a given code change, the amount of PatchRAM memory consumed is dependent on software hook placement. Such software hooks are typically placed at some granularity in the ROM code. If an update occurs many code lines away from a hook, large chunks of code are duplicated into the PatchRAM, which leads to an undesirably large PatchRAM. Or, for a given PatchRAM size, there is a limitation on the number of patches that can be supported. Current designs do not provide a suitable tradeoff to such constraints.

BRIEF DESCRIPTION OF THE DRAWINGS

FIG. 15 is a block diagram contrasting the use of a software instruction converter to convert binary instructions in a source instruction set to binary instructions in a target instruction set according to embodiments of the invention.

DETAILED DESCRIPTION

Figure 1:
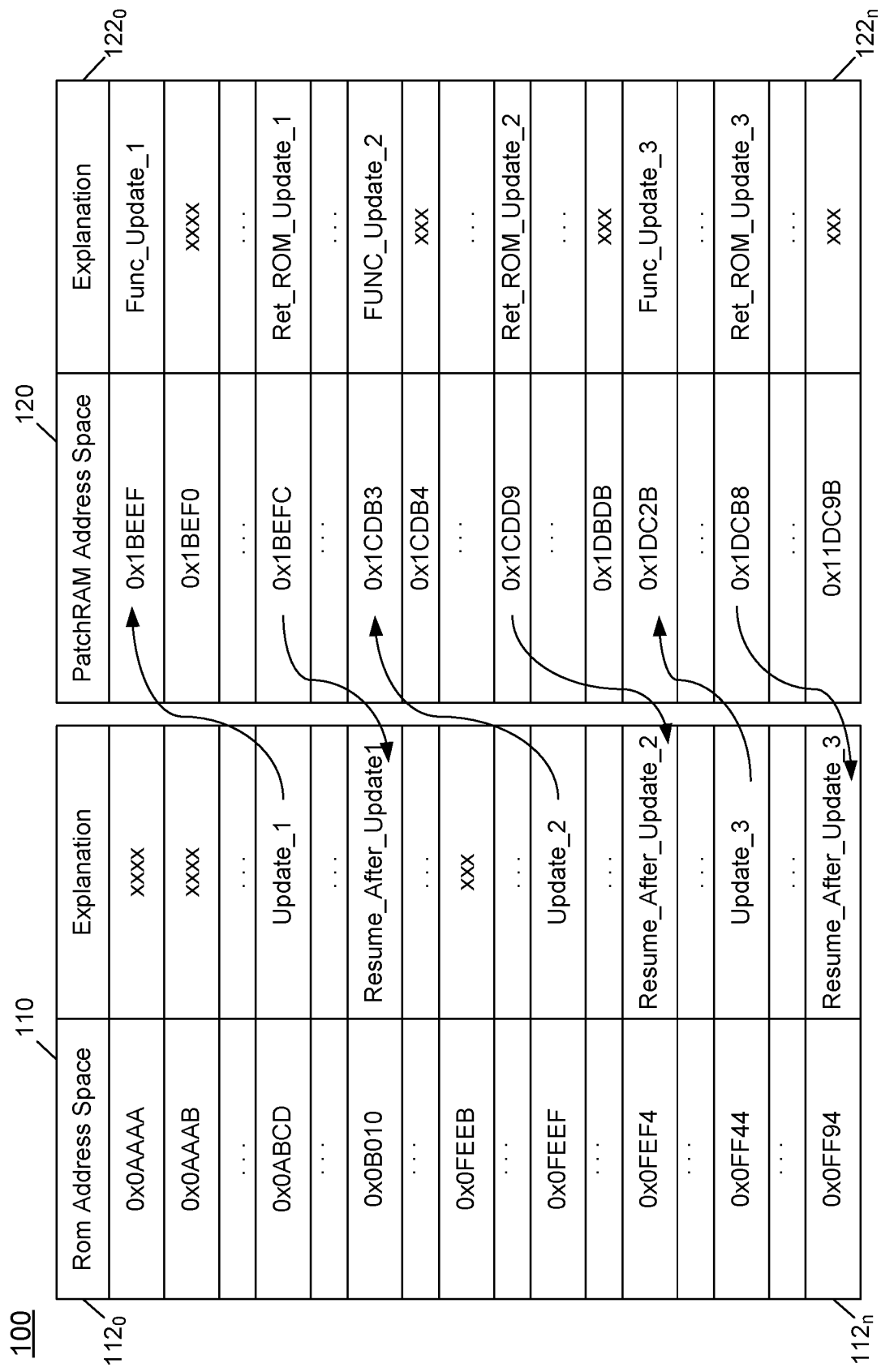
FIG. 1 is a block diagram of example ROM and Patch-RAM address spaces in accordance with an embodiment.

In various embodiments, a dynamic hook system is provided to efficiently enable patching of code stored in read only memory. To this end, embodiments provide techniques that leverage both hardware and software hooks to reduce consumption of PatchRAM storage and also reduce hardware complexity and power consumption while jumping to patch code from ROM code when needed. In this way, the number of potential hardware hooks may be significantly increased, while at the same time reducing complexity and power consumption by dynamically enabling need-based hardware comparisons between a program counter and a hook table only in the neighborhood of a potential update to the ROM code. As a result, embodiments enable very small-sized dynamically constructed ROM hook tables and patch tables to provide for a large number of potential updates to ROM code. In embodiments, the table sizes may typically vary between 4 to 8 for a medium-sized function with new updates for every 25% of lines of code.

With embodiments, the computational overhead of hardware-based comparisons and large storage requirements for large hook and patch tables are reduced. As such, embodiments use a limited size hook table while enabling a large number of patches through hardware hooks with minimal hardware overhead. Embodiments enable reduced Patch-RAM size, since code duplication can be avoided. In addition, hardware comparison circuitry may be optimized with limited computational complexity and hardware register storage requirements, and further realizing reduced overhead for jumping into PatchRAM from ROM, given a relatively small hook table size.

With a dynamic hook system as described herein, a ROM hook table may be built incrementally across ROM updates. In embodiments, this hook table includes a plurality of entries to store locations/instruction addresses where updates/fixes to ROM code are located. When an update is provided, one knows where in the instruction address space the update lies. Embodiments further provide a PatchRAM table (also referred to herein as a "patch table") including a plurality of entries to store information as to where the corresponding updated code sections are stored in the Patch-RAM. For each ROM update, there is a corresponding code section stored in the PatchRAM. In embodiments, the Patch-RAM table includes the start addresses of the code sections stored in the PatchRAM for each and every ROM update.

Embodiments provide a 1:1 mapping between the ROM hook table and PatchRAM table. Stated another way, for each ROM hook address, there is a corresponding update located in PatchRAM at a unique address. As an example, assume at index "x" in the ROM hook table, an instruction address for the "x-th" update to a function in ROM is stored. Assume this instruction address is at 0x0ABCD inside the ROM. Also assume that the corresponding code for the "x-th" update has a start address of 0x1BEEF inside the PatchRAM. For this scenario, in the ROM hook table at the index "x", 0x0ABCD is the value registered, whereas in the PatchRAM table at the index "x", 0x1BEEF is the value registered. In embodiments, the order of entries inside the tables may be user defined. With a new ROM patch, the start address of the updates inside PatchRAM can be changed if desired, in which case the PatchRAM table can be updated accordingly. Also with new ROM patches in a function, a user can fuse one or more patches into a few patches which reflect the change in ROM table entries and patch RAM entries accordingly. Embodiments are very flexible to support all sorts of user definitions. In some embodiments, these tables are loaded from RAM and stored into hardware registers at boot-up.

Referring now to FIG. 1, shown is a block diagram of example ROM and PatchRAM address spaces in accordance with an embodiment. As shown in FIG. 1, an apparatus 100 may be any type of integrated circuit incorporating processing circuitry, memory and so forth, such as a digital signal processor (DSP), single core processor, multicore processor, or system on chip (SoC), as examples. As seen, apparatus 100 includes a ROM 110 and a PatchRAM 120. While illustrated as a separate PatchRAM device, understand the scope of the present invention is not limited in this regard and in embodiments, PatchRAM 120 may be implemented as a portion of a RAM address space, which may also include data RAM, instruction RAM, and/or other general-purpose RAM.

As seen, ROM 110 includes a plurality of storage locations or entries $112_{0-n}$, each at an address of the ROM address space and each to store given code, e.g., of a particular function. Similarly, PatchRAM 120 includes a plurality of storage locations or entries $122_{0-n}$, each at an address of the PatchRAM address space and each to store at least a portion of update code for a given function. As shown in FIG. 1, at address 0x0FEEF, there is a desired "UPDATE_2" to ROM 110, and the actual code for "UPDATE_2" resides in PatchRAM 120 beginning at address 0x1CDB3. Inside PatchRAM 120, at 0x1CDD9, there is a return back to ROM address 0x0FEF4, and execution resumes in ROM 110 beginning at address 0x0FEF4. The arrows in FIG. 1 thus illustrate JUMPs from ROM 110 to PatchRAM 120 at the desired update points and RETURNs, from PatchRAM 120 to ROM 110 after the desired updates.

Figure 2:
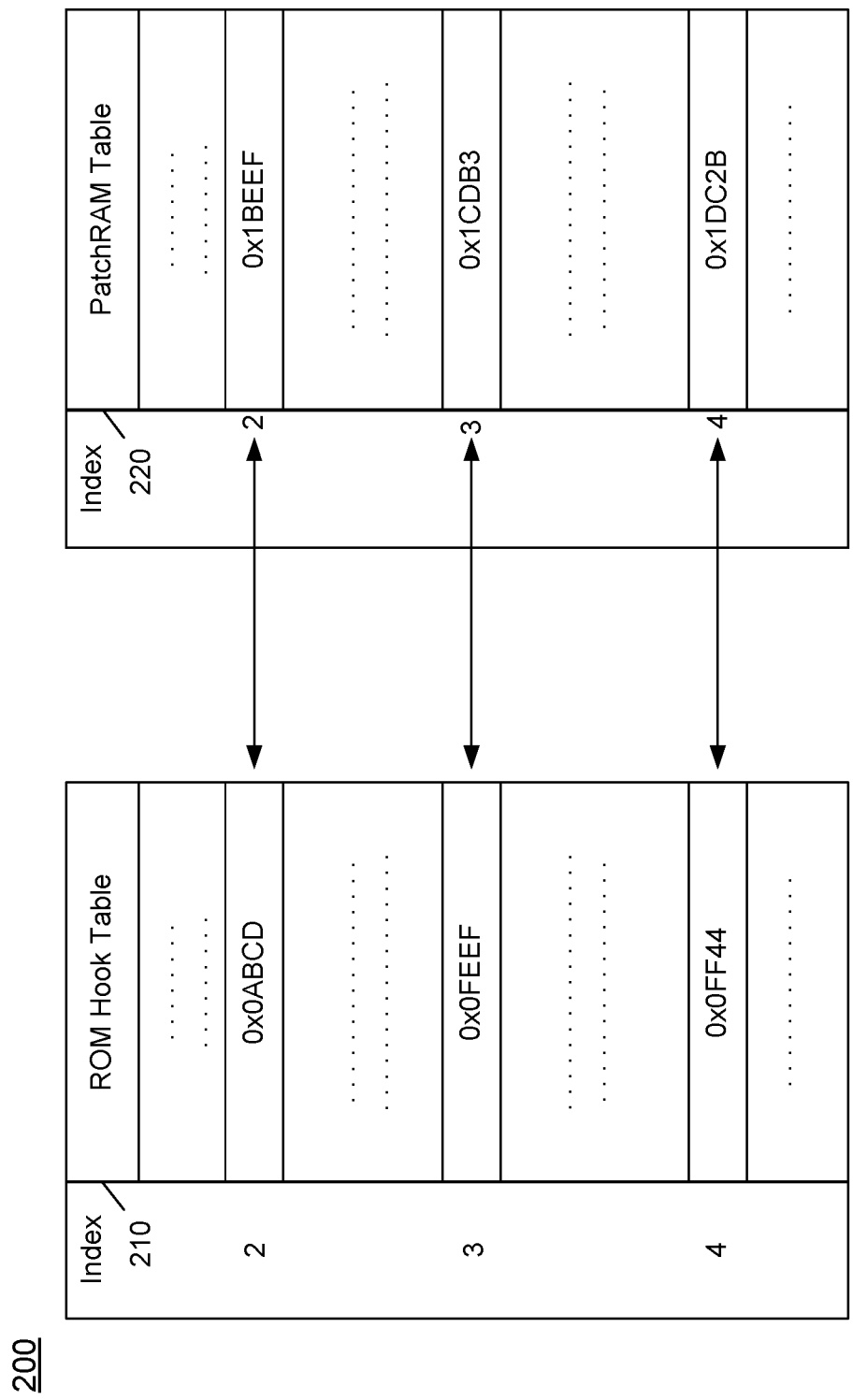
FIG. 2 is a block diagram of representative ROM hook and PatchRAM tables in accordance with an embodiment.

FIG. 2 is a block diagram of representative ROM hook and PatchRAM tables in accordance with an embodiment. More specifically, FIG. 2 shows an arrangement 200 of table storage to store tables to identify locations within a ROM at which updates are to occur, and similarly starting addresses in PatchRAM for those updates. As illustrated in FIG. 2, arrangement 200 includes a hook table 210 that includes a plurality of entries each to store an address in a ROM at which an update is to occur, such that a jump can occur to updated code stored in a PatchRAM. Arrangement 200 further includes a PatchRAM table 220 that includes a plurality of entries each to store an address of a starting address of a code update stored in the PatchRAM. In the illustration of FIG. 2, representative entries within these tables are shown that are based on the address spaces of ROM 110 and PatchRAM 120 of FIG. 1. From FIG. 2, one can see that the location of updates in ROM 110 form entries in ROM hook table 210 and corresponding start addresses of updates in PatchRAM 120 form the entries in PatchRAM table 220. As mentioned before, the order of entries is user-defined.

For example, for "UPDATE_2", the location in ROM 110 is 0x0FEEF and is stored at some particular index in ROM hook table 210. At the same index in PatchRAM table 220, the corresponding entry stores the address 0x1CDB3, which is the start address of "UPDATE_2" in PatchRAM 120. The physical size of ROM hook table 210 defines the maximum number of patches that can be handled in any function. Note that while FIG. 2 shows arrangement 200 in which tables 210 and 220 may be implemented within a RAM, understand that in other cases, for reduced latency and power consumption, tables 210 and 220 may be implemented as registers or other local storage devices included in or otherwise directly accessible by hardware comparator circuitry.

In embodiments, this hardware comparator circuitry that is configured to perform address comparisons between the PC and addresses in the ROM hook table is enabled to execute only in the neighborhood of an occurrence of a ROM update. In contrast, in a static hardware hook implementation without an embodiment, such comparisons execute at all times. Embodiments provide a small piece of code at the start of every function in ROM, referred to herein as a comparator activator, described further below. In embodiments, ROM code may be embedded with these activators at regular intervals (e.g., at the start of each function or at periodic intervals in case of pure assembly code). The comparator activator also can be modeled as a special instruction that loads the ROM/PatchRAM tables as part of hardware registers based on the enabling of an activator ID. Based on the ID, the instruction invokes a hardware logic to fetch the entries (which are also stored in data RAM) to be loaded into ROM/PatchRAM tables.

Note that these activators are not the same as software hooks, as their purpose is not to execute a patch update in PatchRAM, but instead to enable hardware comparator logic and dynamically construct ROM hook tables when one or more potential updates are sensed within that function (e.g., within a neighborhood of a patch update in ROM).

Referring now to Table 1, shown is pseudo-code of an example comparator activator in accordance with an embodiment.

TABLE 1

```
COMPARATOR_ACTIVATE (int ACTIVATOR_ID)
{
    COMPARE_REGISTER = 0;
    switch ACTIVATOR_ID
    {
    case 0:
        break;
    case 1:
        break;
    ...........
    case 14:
        HOOK_ADDRESS_IN_ROM[0] = 0xABCD; // HOOK table
        PATCH_ADDRESS_IN_RAM[0] = 0x1BEEF; // PatchRAM table
        HOOK_ADDRESS_IN_ROM[1] = 0xBADE; // HOOK table
        PATCH_ADDRESS_IN_RAM[1] = 0x1CEED; // PatchRAM table
        COMPARE_REGISTER = 1; // hardware comparator enabled
        break;
    ...........
    }
}
```

As illustrated in Table 1, initial comparator activation code initializes hardware comparison circuitry to be in a disabled state (namely by resetting a compare register). Thereafter, the comparator activation code, which may be stored in the PatchRAM itself, includes multiple cases, each associated with a particular function of code within ROM storage. As illustrated, each case may simply include a break to return control back to a given function when no code update is to occur within that function. However, in the case that a function has update code (such as shown for Function 14), corresponding hook and patch addresses are included in the comparator activation code that, responsive to execution of the comparator activation code, updates the hook and PatchRAM tables with these addresses and activates hardware comparison circuitry by setting the compare register. Note that it is also possible to reset the compare register as part of boot code. If not, the very first function of ROM execution as part of its comparator activation code will start with the reset of the compare register.

Figure 3:
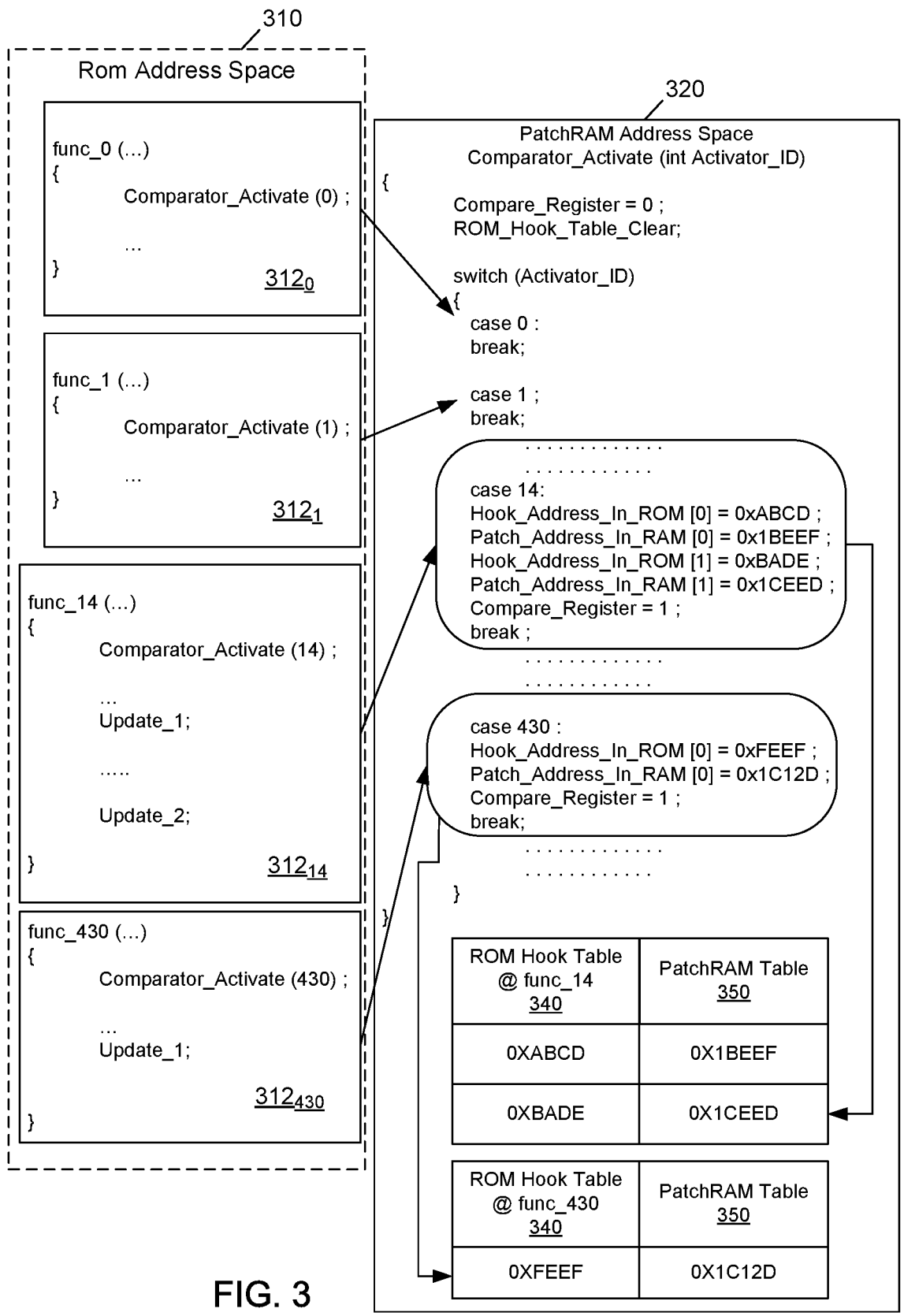
FIG. 3 is a block diagram illustrating interaction between ROM and RAM address spaces in the context of comparator activations in accordance with an embodiment.

Referring now to FIG. 3, shown is a block diagram illustrating interaction between ROM and RAM spaces in the context of comparator activations in accordance with an embodiment. As shown in FIG. 3, apparatus 300 includes a ROM 310 and a PatchRAM 320, which may generally be implemented as discussed above. With regard to ROM 310 note the presence of a plurality of functions, with several representative functions shown in more detail. More specifically, representative functions within a set of functions $312_0$-$312_{430}$ are shown. While many such functions may be present in particular embodiments, understand that a number of functions may be limited only by the size of a given ROM.

To effect embodiments herein with dynamic updating of hook and PatchRAM tables and corresponding dynamic enabling of hardware comparison circuitry only in the vicinity of a code update, note that each function is annotated or instrumented with a comparator activator, which acts as a function call to a corresponding case within comparator activation code stored in PatchRAM 320. As seen for functions $312_0$ and $312_1$, these comparator activations, which cause a jump to this comparator activation code, within PatchRAM 320 do not result in any update to hook and PatchRAM tables, nor activation of comparator circuitry, as there are no updates associated with these functions. Although in the embodiment of FIG. 3, functions 312 are annotated with a comparator activator, in other cases, a special-purpose instruction may be used to cause control to jump from a given function to comparator activation code within PatchRAM 320. In some cases, an instruction set architecture (ISA) may include an activation instruction which, when executed, causes the jump from code within ROM to comparator activation code as stored in a RAM.

With regard to function $312_{14}$, e.g., the activator code, which is triggered to execute at the beginning of the function, updates hook and patch tables and enables the hardware comparator logic. For example in the above activator code of Table 1, the Activator with ID as "14" is activated because the two updates (UPDATE_1 and UPDATE_2) are present in the function in which the "Activator-ID=14" is present. As seen, at case 14 within the comparator activation code, a dynamic update occurs to hook table 340 and PatchRAM table 350. Specifically as shown, corresponding hook addresses that correspond to the addresses within the functions at which updates are present are stored in hook table 340. Similarly, PatchRAM table 350 stores the starting address of these code updates within PatchRAM 320. Note that these tables are cleared at the start of the activator function to be ready for dynamic updates in the subsequent execution based on an "activator-id" to enable dynamic update of these tables, such that when an additional function (namely function $312_{430}$) executes, another update to these tables occurs to enable update code stored within PatchRAM 320 to execute as appropriate. Note further that the comparator activation code for these active cases also enables hardware comparator circuitry, by way of setting the compare register. Understand while shown at this high level in the embodiment of FIG. 3, many variations and alternatives are possible.

Every activator in ROM is enumerated with a unique ID a priori. The activator code as in Table 1 is stored in PatchRAM. The switch cases inside the activator are defined based on the desired updates, location in ROM and corresponding neighbor activator.

When the "Activator-ID" is enabled in the activator function, as the function executes: the ROM hook table is populated dynamically with the location of updates in ROM based on number of updates in that function, and those many entries are listed in the ROM hook table. In this example of function $312_{14}$, two updates result in two entries loaded into ROM hook table 340. Note that PatchRAM table 350 has the same number of entries as ROM hook table 340, and it is constructed dynamically. Namely in embodiments there is a 1-1 mapping between location of update in ROM and location of update definition in PatchRAM as shown in FIG. 3. Also in the activator, a COMPARE_REGISTER is set to 1, as in the example of case 14 in Table 1. Also, at the start of the activator, ROM hook/PatchRAM tables are cleared and the COMPARE_REGISTER is cleared to zero. For new activated functions, ROM hook table 340 is adaptively built based on need for the number of patches in that function, e.g., function $312_{430}$ causes the tables to be built with a single entry. Thus the ROM hook and PatchRAM tables are dynamically constructed for every function that is executed. The sizes of these tables define the maximum number of updates a given ROM function can have.

Once the COMPARE_REGISTER is set to 1, only then is hardware comparator logic is enabled. The hardware comparator logic compares the PC with the dynamically built ROM hook table and looks for a match. If a match is found at an index in the ROM hook table, then the value at the same index in the PatchRAM table is assigned to the PC, as represented by the pseudocode sequence of Table 2.

TABLE 2

MATCH_REG ←INDEX (MATCHED ADDRESS) @ HOOK TABLE
PC←@(PATCH_TABLE_BASE+MATCH_REG)

Note that at the start of a next function, the activator is again executed. If there is no hook enabled in that function, the activator resets the COMPARE_REGISTER to 0, thus disabling the hardware comparator for the next function. In this way, the computational overhead for the hardware comparator between PC and ROM hook table is drastically reduced, and limited only to the ROM functions that are to be patched.

Figure 4:
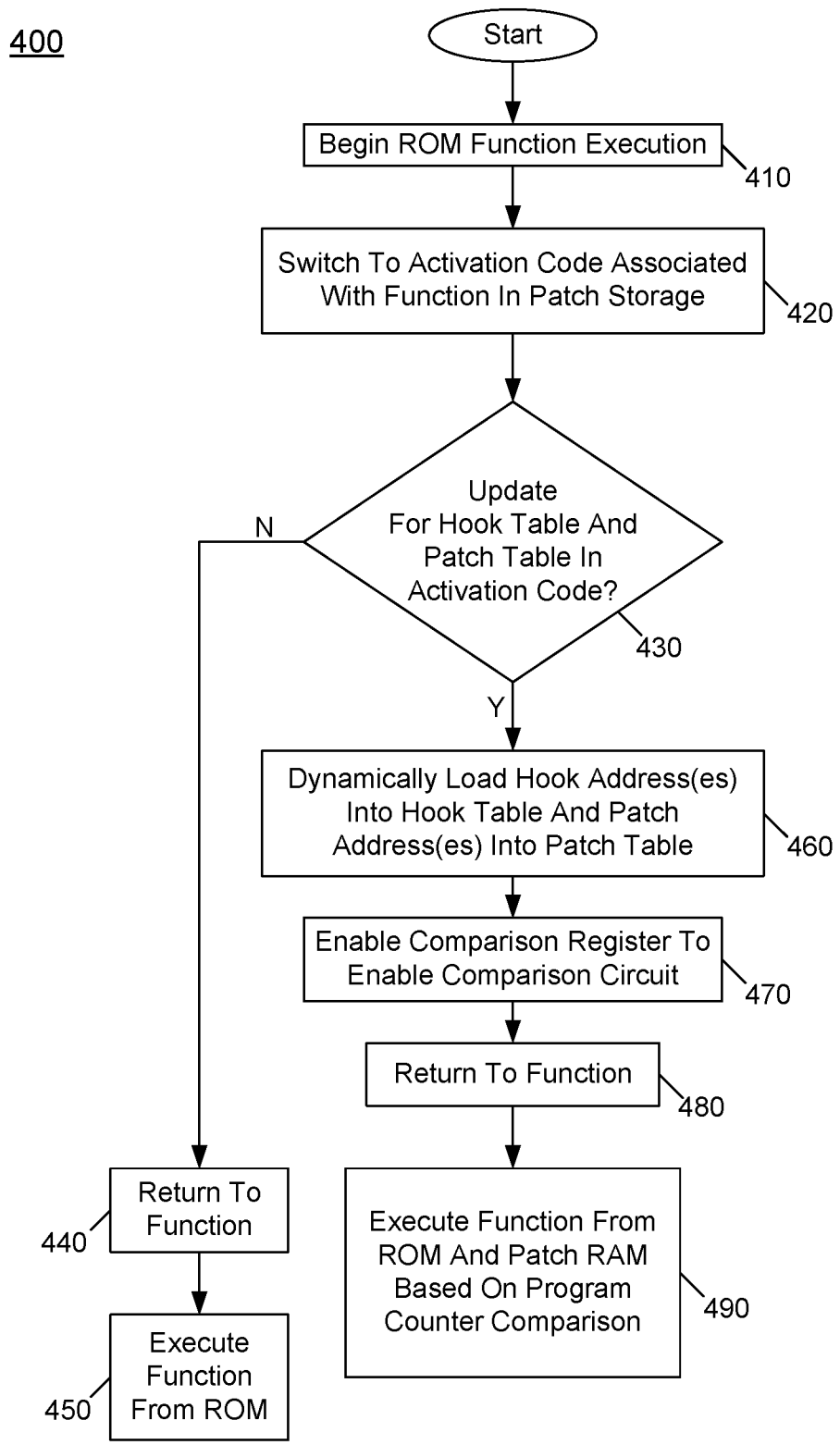
FIG. 4 is a flow diagram of a method in accordance with an embodiment.

Referring now to FIG. 4, shown is a flow diagram of a method in accordance with an embodiment. More specifically method 400 is a method for executing instructions stored in ROM, where the ROM may include code updates stored in a PatchRAM in which the mechanism to jump from ROM code to PatchRAM code may occur based at least in part on activation code as described herein. As such, method 400 may be performed by hardware circuitry, firmware, software and/or combinations thereof.

As illustrated, method 400 begins by executing code within a ROM. More specifically at block 410 a function that is stored in ROM may be in execution. Control next passes to block 420 where, via an activation code within this ROM function, control switches to activation code that is associated with the function, which is stored in a patch storage (e.g., PatchRAM) (block 420). Next it is determined at diamond 430 whether there is an update for the hook and patch tables within this activation code. If it is determined that no such update is present, such as the case where the activation code simply includes a break that causes control to pass back to the ROM, operation proceeds to block 440. Thus control returns to the function, and thereafter at block 450 the function is executed from the code stored within the ROM.

Instead if it is determined that there are updates to the hook and patch tables, control passes from diamond 430 to block 460 where addresses may be dynamically loaded into the hook and patch tables. More specifically one or more hook addresses may be loaded into the hook table and similarly, one or more patch addresses may be stored into the patch table. Control next passes to block 470 where a comparison register may be enabled that in turn causes a hardware comparison circuit to be enabled. Of course other mechanisms to enable the hardware comparison circuit may occur. For example, instead of controlling enablement by way of a compare register, a control circuit, e.g., coupled to the hardware comparator, may simply cause the comparator circuit to be enabled responsive to the update to the hook and patch tables. Thereafter, control passes to block 480 where control returns to the function within ROM. Thereafter at block 490 this function is executed using code either within the ROM or the patch storage, as determined based upon matches between the program counter and the one or more hook addresses stored in the hook table. Understand while shown at this high level in the embodiment of FIG. 4, many variations and alternatives are possible.

Figure 5:
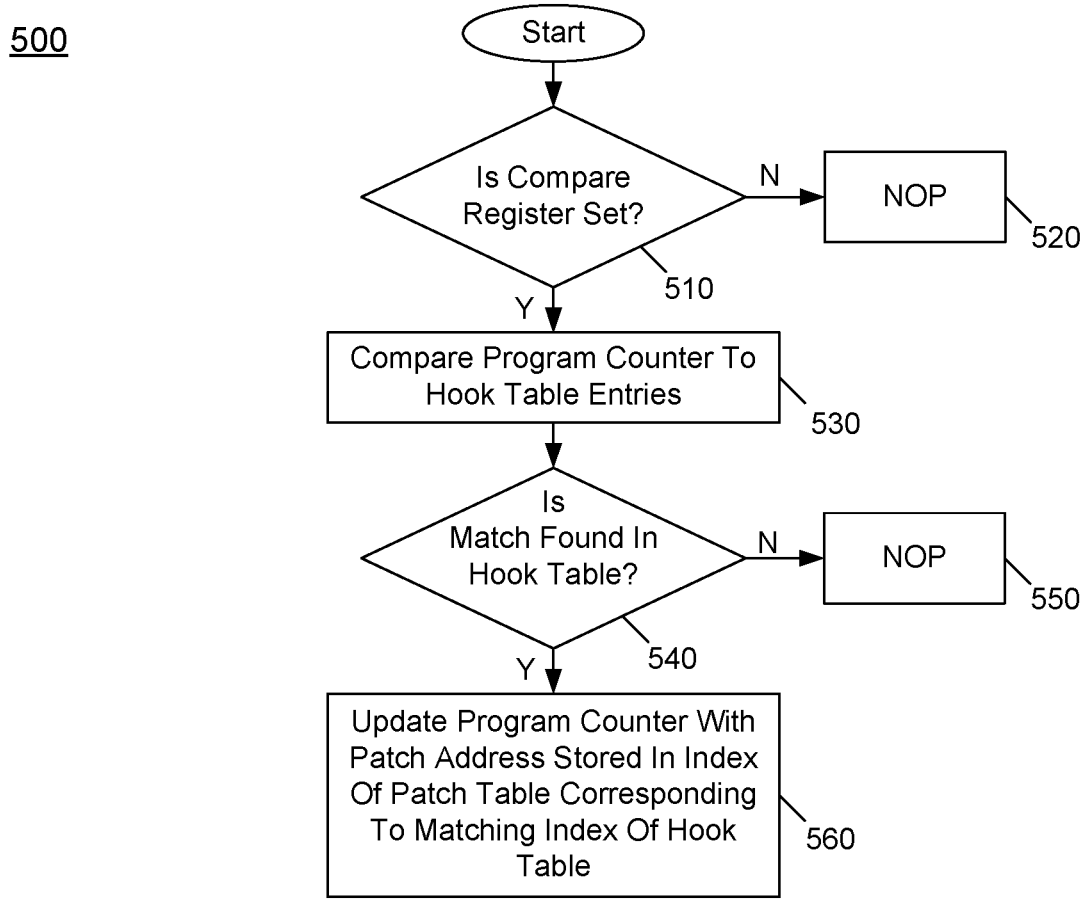
FIG. 5 is a flow diagram of a method for performing a hardware comparison in accordance with an embodiment.

Referring now to FIG. 5, shown is a flow diagram of a method for performing a hardware comparison in accordance with an embodiment. As shown in FIG. 5, method 500, which may be performed by hardware comparator circuitry in an embodiment, may be used to identify when execution is to switch from instructions stored in ROM to instructions stored in PatchRAM. As illustrated, method 500 begins by determining whether a compare register is set, which indicates whether the hardware comparison circuit is to be enabled (diamond 510). If not, no further operation occurs and control passes to block 520 where a no operation (NOP) may be performed. Instead if the hardware comparison logic is enabled, control passes to block 530 where the program counter is compared to entries in the hook table. Based upon this comparison, it is determined whether a match is found (at diamond 540). If no match is found, at block 550 a NOP is performed, meaning the program counter stays unaltered. Instead if a match is found, control passes to block 560 where the program counter may be updated with a patch address. More specifically this patch address is stored in the patch table at the index corresponding to the matching index of the hook table. As such, the program counter is updated to the starting address within the PatchRAM at which the code update is located, such that execution of the updated code may proceed. Understand while shown at this high level in the embodiment of FIG. 5, many variations and alternatives are possible.

For example with reference back to Table 2 (and FIG. 2), take the example of PC=0xABCD. Upon a match between this PC and an entry in ROM hook table, a match register is set to 2, which is the index of the matched entry in the ROM hook with the value of the PC. When the match register is set to this value of 2, the corresponding entry at index 2 within the patch table (based on a sum of the base address of the patch table and the index), which stores an address of 0x1BEEF, is assigned to the PC, thus causing execution to jump from code stored in the ROM to code stored in the patchRAM, to thus execute the ROM update.

With embodiments as described herein, using optimized hardware comparator logic and dynamic population of ROM hook and PatchRAM tables, patch point resolution in any function may be considerably increased with minimal hardware overhead. As such, ROM code can be provided that allows for a large number of patches, reducing the vulnerability of ROM code to bugs and patch point limitations.

Note that the activator code may consume some amount of PatchRAM memory. For a ROM having a potentially large number of switch cases, an alternate embodiment may be used. In this embodiment, an enable bit of all activator functions can be loaded into a data RAM at boot. More specifically, an enable mask may be stored with a bit for each function which, when set, indicates that the corresponding function includes at least one update. Then at boot, this enable mask may be loaded into data RAM. Similarly, ROM hook tables and PatchRAM tables for activated functions are also loaded into data RAM, also at boot. As such, when an activator is executed at the start of a ROM function, the enable bit within the enable mask is checked in the data RAM based on its "Activator-id". If the enable bit is set, the ROM hook table and patch table are populated dynamically from data RAM. In embodiments, reduced latency may be realized by loading at least portions of the enable mask, along with hook table and patch table portions into hardware registers. And with a special instruction modeling the comparator activator at the start of every function, there is an automatic fetching of ROM/PatchRAM tables from data RAM into registers based on an "activator-id." In this way, there is near-zero PatchRAM usage for activator functions, and an overall net reduction in total RAM (PatchRAM and data RAM) is realized. Note that in such embodiments, there may be some additional but manageable cost in terms of processor compute cycles related to unpacking of the enable bits of the activator functions.

Figure 6:
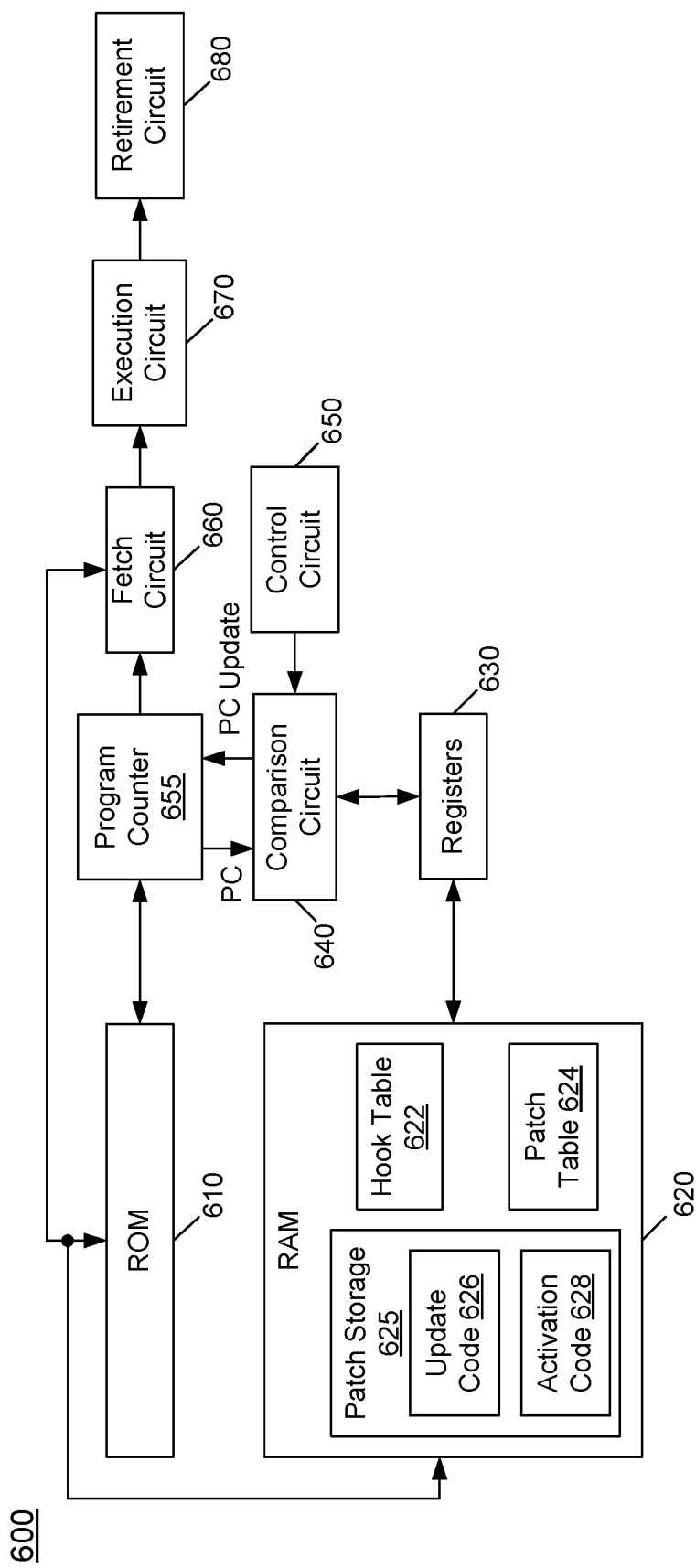
FIG. 6 is a block diagram of a processor in accordance with an embodiment.

Referring now to FIG. 6, shown is a block diagram of a processor in accordance with an embodiment. More specifically, FIG. 6 is a block diagram of a processor 600, which may be any type of processing circuitry, such as DSP, general-purpose processor or so forth that is leveraged to execute embedded code, namely ROM code. However, it is still possible that this ROM code may suffer from bugs or may desirably be updated in the field, such that processor 600 may leverage embodiments to efficiently implement code updates with reduced RAM space utilization and reduced power consumption and hardware computational complexity.

As illustrated, processor 600 includes a ROM 610 and a RAM 620. As further shown, RAM 620, which may be a static random access memory (SRAM), dynamic random access memory (DRAM) or other type of volatile storage, includes dedicated storage for patches, namely a patch storage 625, e.g., a PatchRAM. As illustrated, patch storage 625 itself includes update code 626 and activation code 628, as described herein. As further illustrated, RAM 620 may include a hook table 622 and a patch table 624. Of course additional storage within RAM 620 may be used as data storage and/or instruction storage. Further as described herein in an alternate embodiment, RAM 620 also may be used as data RAM to store enable masks to provide information regarding presence of updates within functions.

As further illustrated in FIG. 6, RAM 620 couples to a set of registers 630. To this end, when a dynamic update is to occur to hook and PatchRAM tables, addresses may be dynamically loaded from corresponding tables 622, 624 into registers 630, for more ready access by a comparison circuit 640. Comparison circuit 640, when enabled by a control circuit 650 (e.g., by setting of a compare register (which itself may be present within registers 630)), performs comparisons between a value in a program counter 655 and entries within hook table 622 (namely those entries that are dynamically stored into registers 630). In embodiments, control circuit 650 may further be configured to dynamically load entries into registers 630, e.g., from tables 622, 624 in response to an indication of a code update in proximity to ROM code undergoing execution. Control circuit 640 may be dedicated hardware logic, in an embodiment, or it may be implemented via general-purpose processing circuitry.

When comparison circuit 640 identifies a match, it may cause an update to the PC stored within program counter 655 to be updated to the starting address of update code within patch storage 625. As illustrated, the PC is provided to a fetch circuit 660 that in turn may fetch corresponding instructions from a given one of ROM 610 or RAM 620 based on the PC, and provide instructions, after any decoding (e.g., via a decoder circuitry not shown for ease of illustration in FIG. 6), to an execution circuit 670. Execution circuit 670 may perform various operations pursuant to the instructions. Thereafter, the instructions may retire via a retirement circuit 680. Understand while shown at this high level in the embodiment of FIG. 6, many variations and alternatives are possible.

Figure 7:
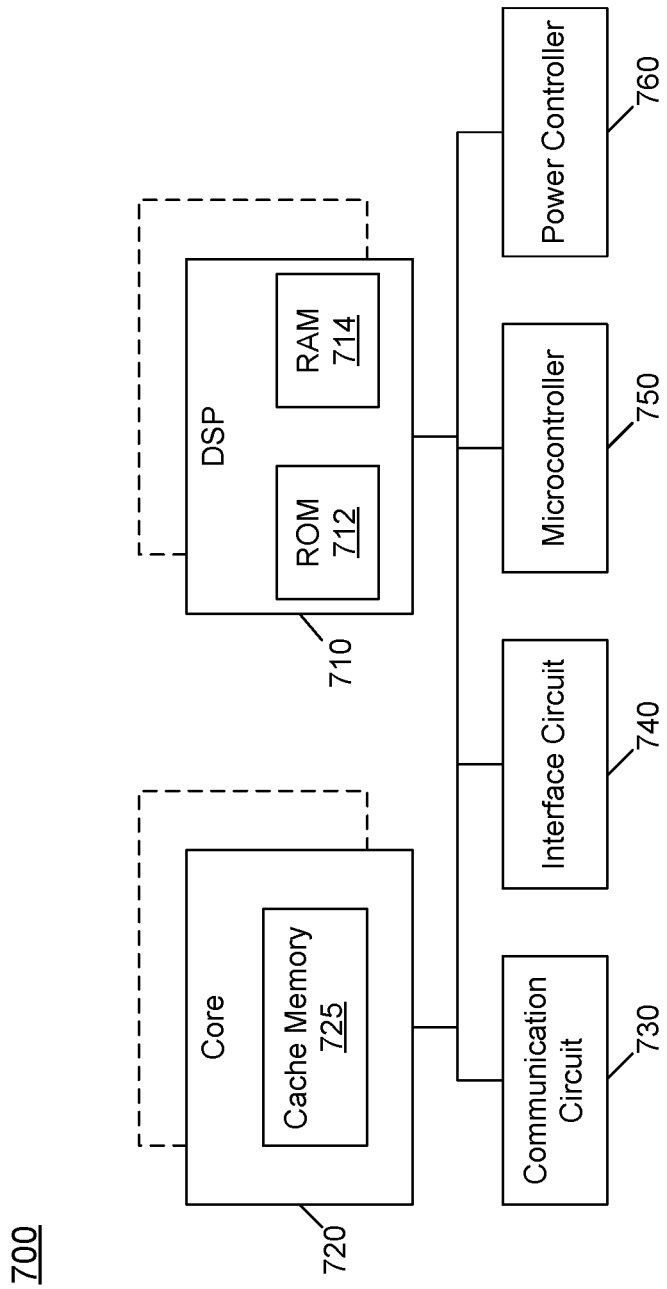
FIG. 7 is a block diagram of an integrated circuit in accordance with an embodiment.

Referring now to FIG. 7, shown is a block diagram of an integrated circuit in accordance with an embodiment. More specifically, integrated circuit 700 may be any type of IC, ranging from DSP, SoC multicore processor or any other circuit including processor circuitry, such as an embedded circuit, e.g., implemented within an Internet of Things (IoT) device or a communication modem processor, which may execute ROM-stored code.

As seen in FIG. 7, IC 700 may include one or more DSPs 710. As illustrated, DSP 710 may include a ROM 712 and a RAM 714 and may leverage embodiments to enable dynamic updates to code stored in ROM 710 via storage of patch code within RAM 714. As further illustrated, one or more cores 720 may be present. Such cores may be so-called x86 cores and may execute instructions in order or out-of-order, depending upon implementation. As illustrated, core 710 may include an integrated cache memory 725. As further illustrated, core 720 and DSP 710 may couple to additional circuits, including communication circuit 730 which may provide for wired and/or wireless communication, an interface circuit 740 which may provide one or more interfaces to on-chip and/or off-chip components and hardware peripherals, a microcontroller 750 and a power controller 760. For example, interface circuit 740 may be implemented as a hardware interface to various intellectual property (IP) blocks, such as a microphone, speaker, camera or so forth. Understand while shown at this high level in the embodiment of FIG. 7, many variations and alternatives are possible.

With embodiments, gains may be achieved as compared to software hooks and hardware hooks in terms of Patch-RAM space, computational complexity of hardware comparators, and number of hardware registers for storing tables. Take an example of a software module that is flashed into ROM and PatchRAM is used for the updates to the ROM code. Further assume that this code contains 3000 functions in ROM, each of size 1 KB. Assume also there is an update that impacts 1000 functions in the ROM. For the sake of discussion, consider that the actual space of every patch is very small and that the distribution of location of patches in the functions is uniform and corresponds to an average location of patches in the middle of the function. Assume a 32-bit instruction address space and the size of every instruction is 6 bytes. Given this example, embodiments herein may realize reductions in wasted PatchRAM space for code duplication, lesser amounts of PatchRAM use for interaction between ROM and RAM execution, reduction in ROM hook and PatchRAM table sizes; reduced number of hardware comparisons that are performed by comparison circuitry, and reduction in frequency of hardware comparisons, all of which provide technical enhancements over a pure hardware or software hook approach.

As a function of the number of patches to be done on ROM code, with a pure hardware or software approach without an embodiment, either the RAM size or the logic complexity increases dramatically with the number of patches. Instead with an embodiment, reduced chip area can be optimized, e.g., ½ or ⅓, based on implementation. In an example embodiment, a PatchRAM may be between 32 k-64 k. Note that for a software hook-based implementation without an embodiment, the cost of patching a high number of ROM errors quickly becomes prohibitive due to the huge PatchRAM size required. Embodiments further provide power consumption benefits, as address comparison may only be performed in the neighborhood of a patch update, in contrast to a continuously powered comparator in a hardware-hook based implementation.

With embodiments herein, large software updates on ROM-based products may occur without any ROM spin and within a very short cycle of time-to-market. And with embodiments, a relatively small-sized PatchRAM may be provided for a specified allowable number of patches to a ROM. Embodiments may be incorporated into such products as diverse semiconductor devices to perform various functionality such as multimedia coders, modem layer-1 software, consumer electronics, IOT platforms, wireless products, and so forth.

Figure 8A:
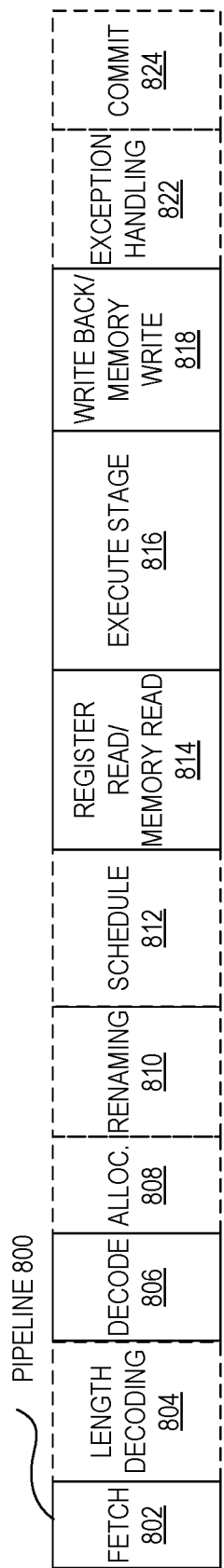
FIG. 8A is a block diagram illustrating both an exemplary in-order pipeline and an exemplary register renaming, out-of-order issue/execution pipeline according to embodiments of the invention.
Figure 8B:
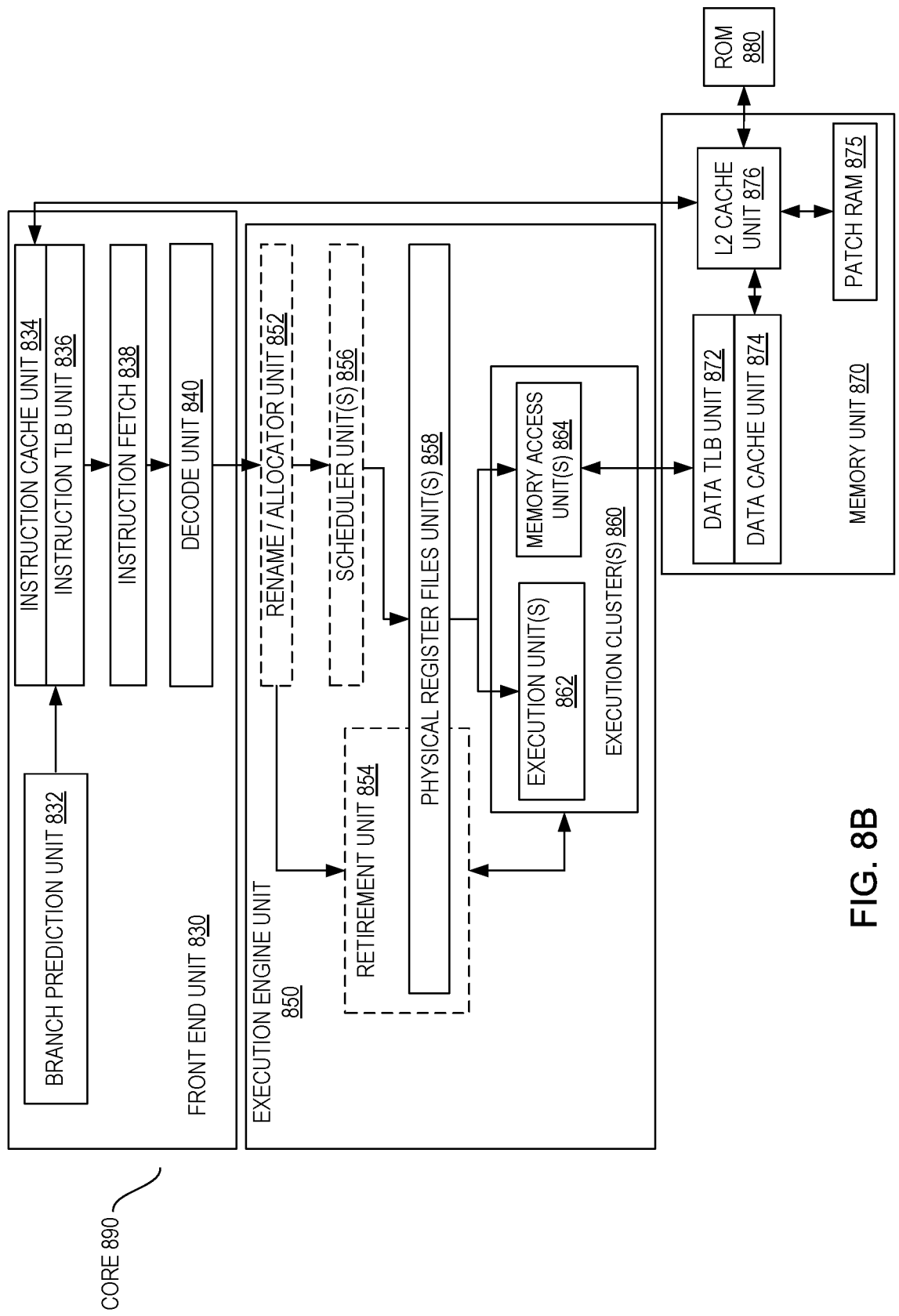
FIG. 8B is a block diagram illustrating both an exemplary embodiment of an in-order architecture core and an exemplary register renaming, out-of-order issue/execution architecture core to be included in a processor according to embodiments of the invention.

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A and 8B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824. In embodiments, fetch stage

802 may be configured to selectively obtain instructions from one of a ROM and PatchRAM as described herein.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850. As further illustrated, the front end unit 830 may further interact with a ROM 880, which may store embedded code as described herein, and further interact with a PatchRAM 875, which may store patch code and activator code in accordance with embodiments.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector register unit, a write mask register unit, and a scalar register unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9B:
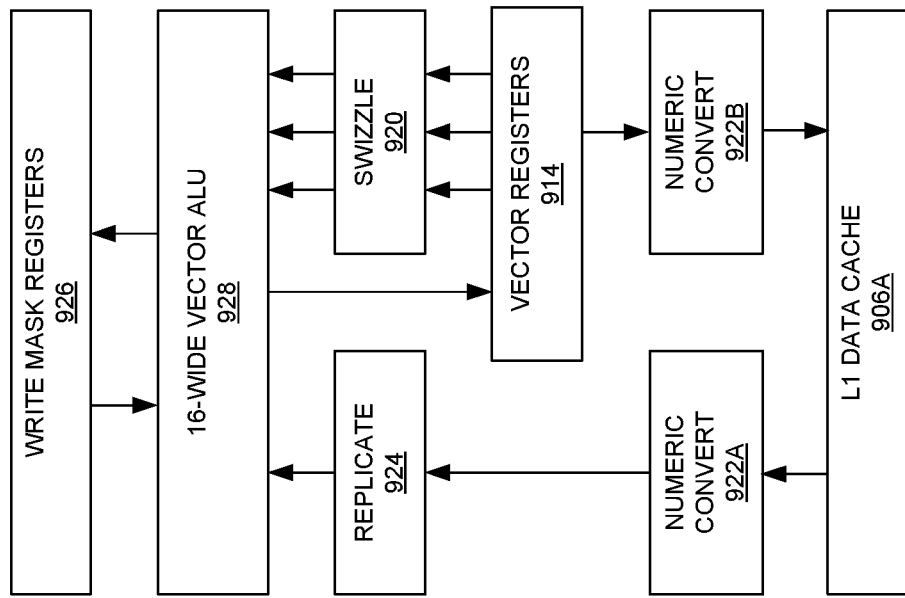
FIGS. 9A and 9B illustrate a block diagram of a more specific exemplary in-order core architecture, which core would be one of several logic blocks (including other cores of the same type and/or different types) in a chip.
Figure 9A:
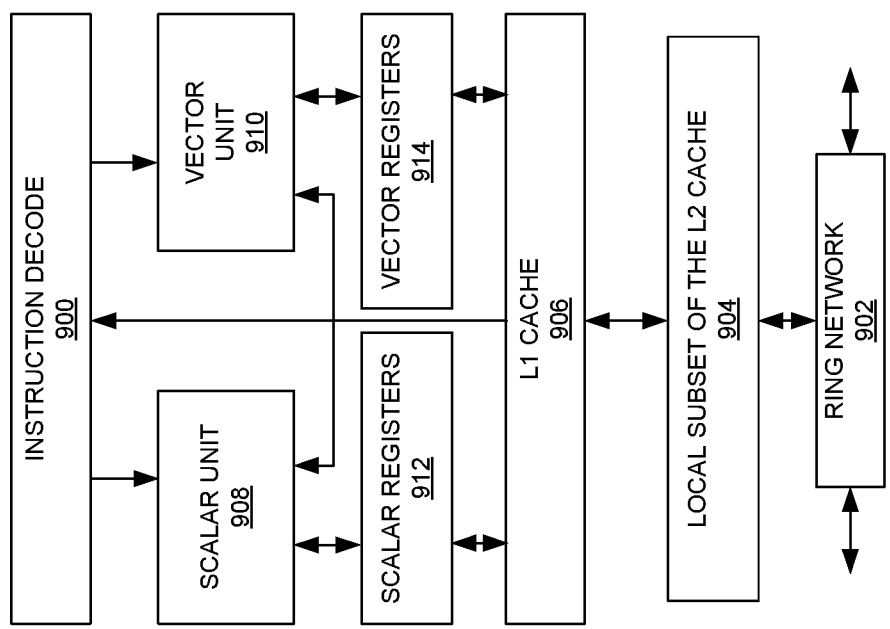

FIGS. 9A and 9B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 512-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Figure 10:
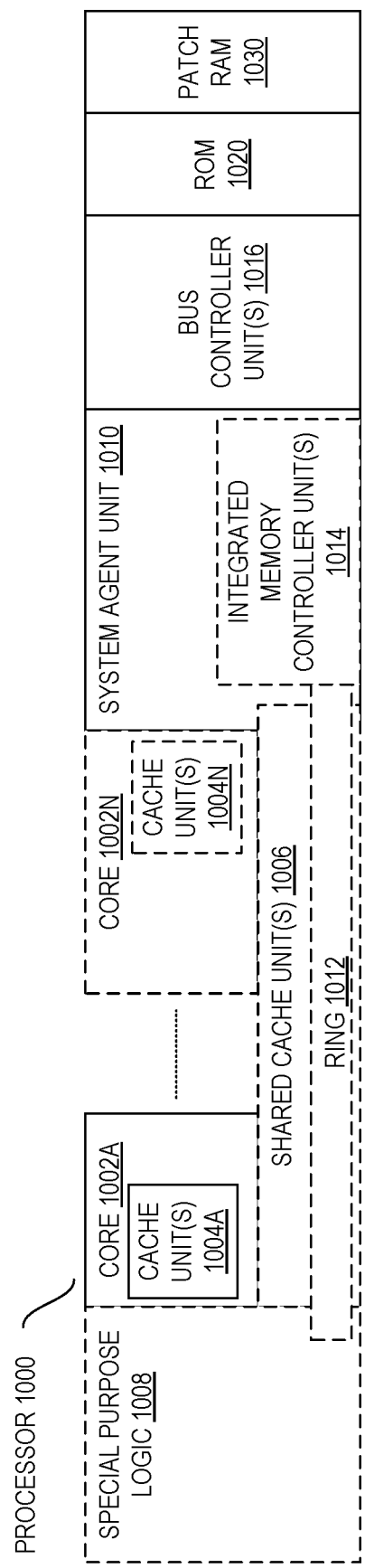
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache units 1004A-N within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the special purpose logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002 A-N.

In some embodiments, one or more of the cores 1002A-N are capable of multithreading. The system agent unit 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set. As further illustrated, the cores 1002A-N may execute embedded code such as functions that can be stored in ROM 1020, in addition to any patch code for these functions as stored in PatchRAM 1030, which further may store activation code as described herein.

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
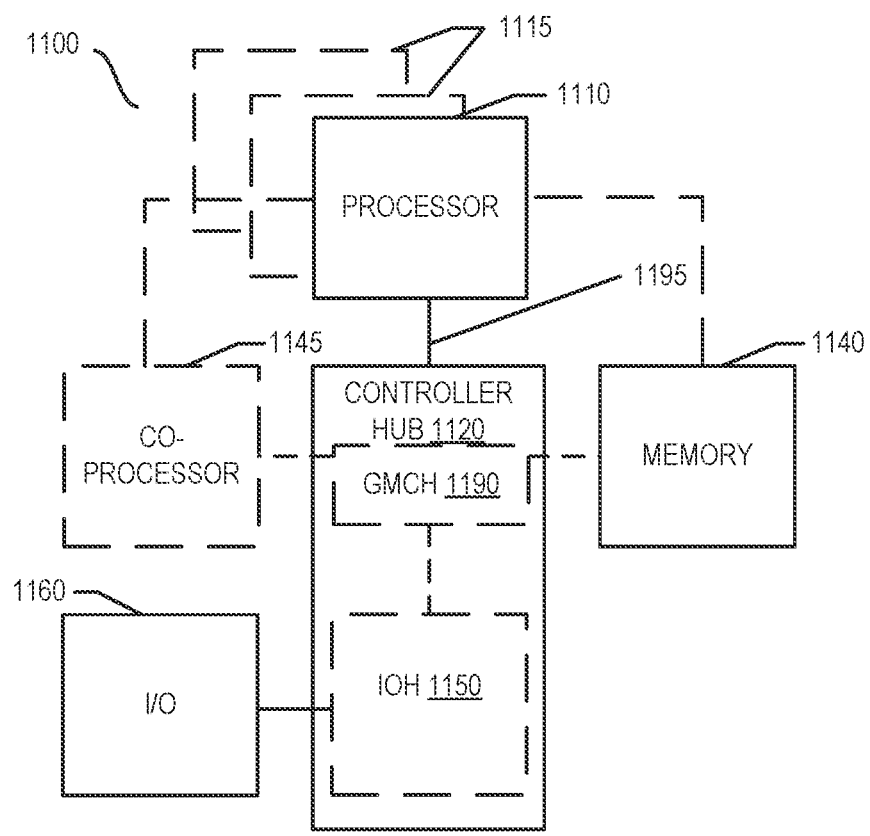
FIG. 11 is a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes a memory controller and a graphics controller to which are coupled memory 1140 and a coprocessor 1145; the IOH 1150 couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type and may execute, e.g., embedded code stored in a combination of ROM and PatchRAM as described herein. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
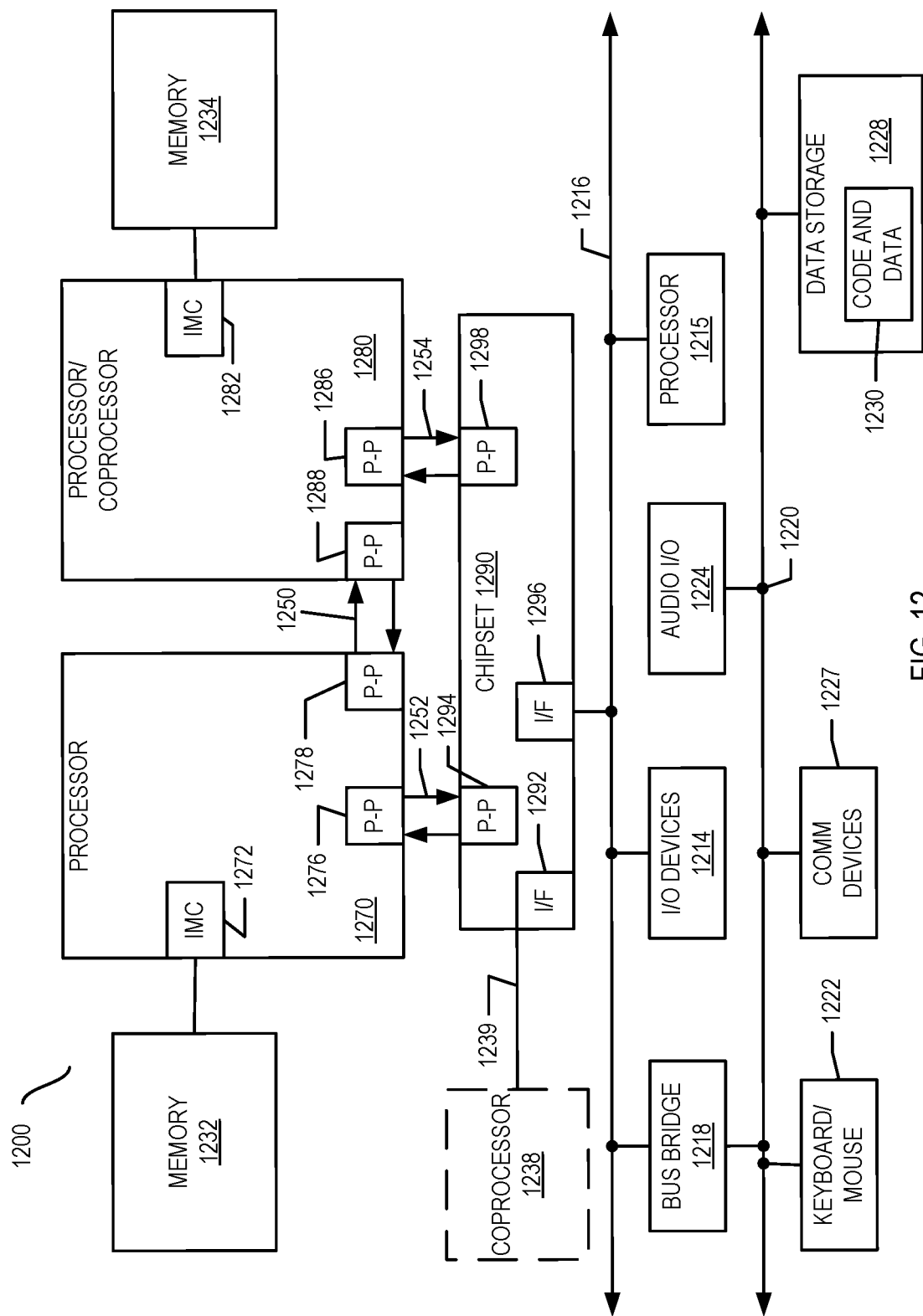
FIG. 12 is a block diagram of a first more specific exemplary system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1110, while coprocessor 1238 is coprocessor 1145. In another embodiment, processors 1270 and 1280 are respectively processor 1110 and coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
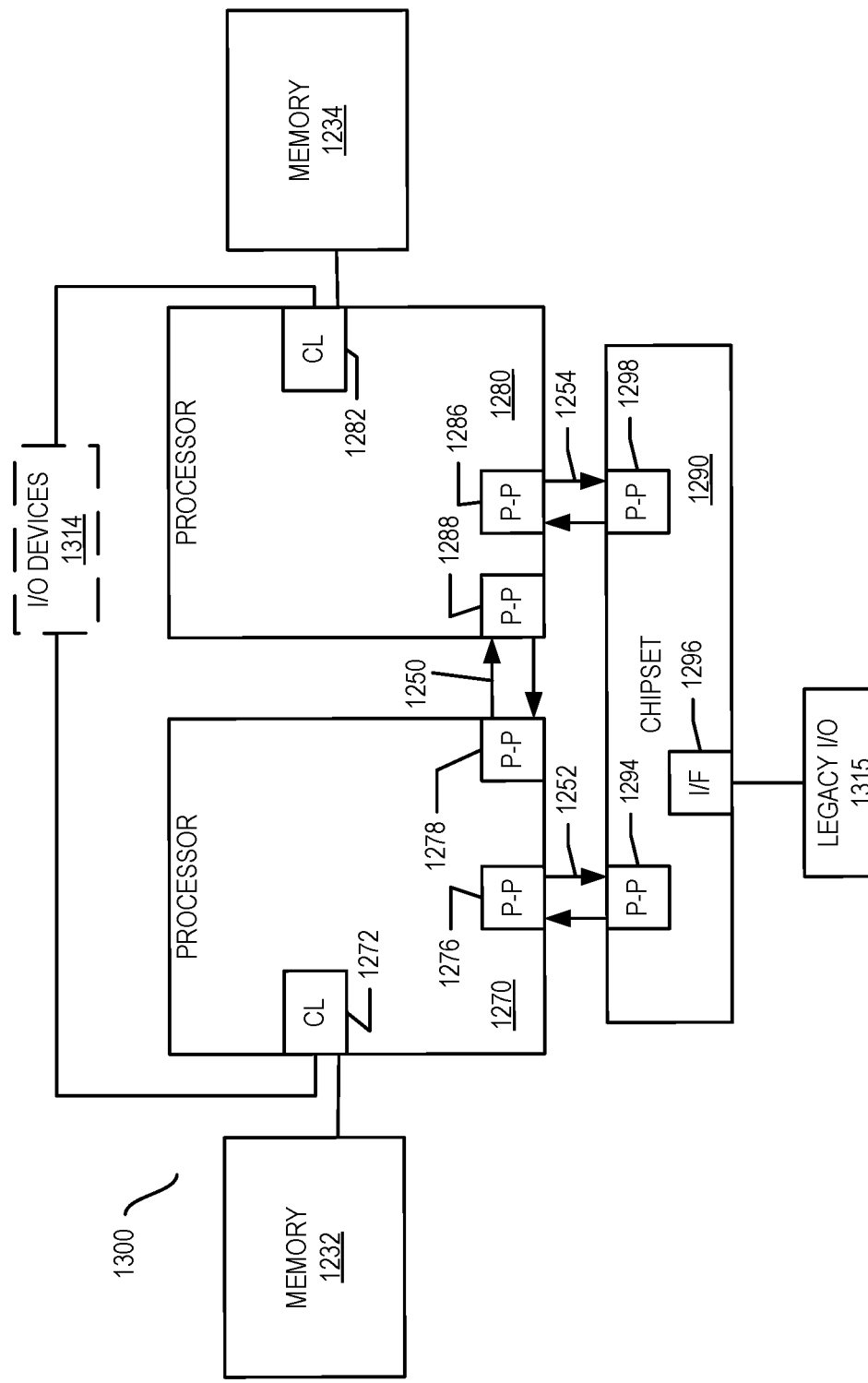
FIG. 13 is a block diagram of a second more specific exemplary system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
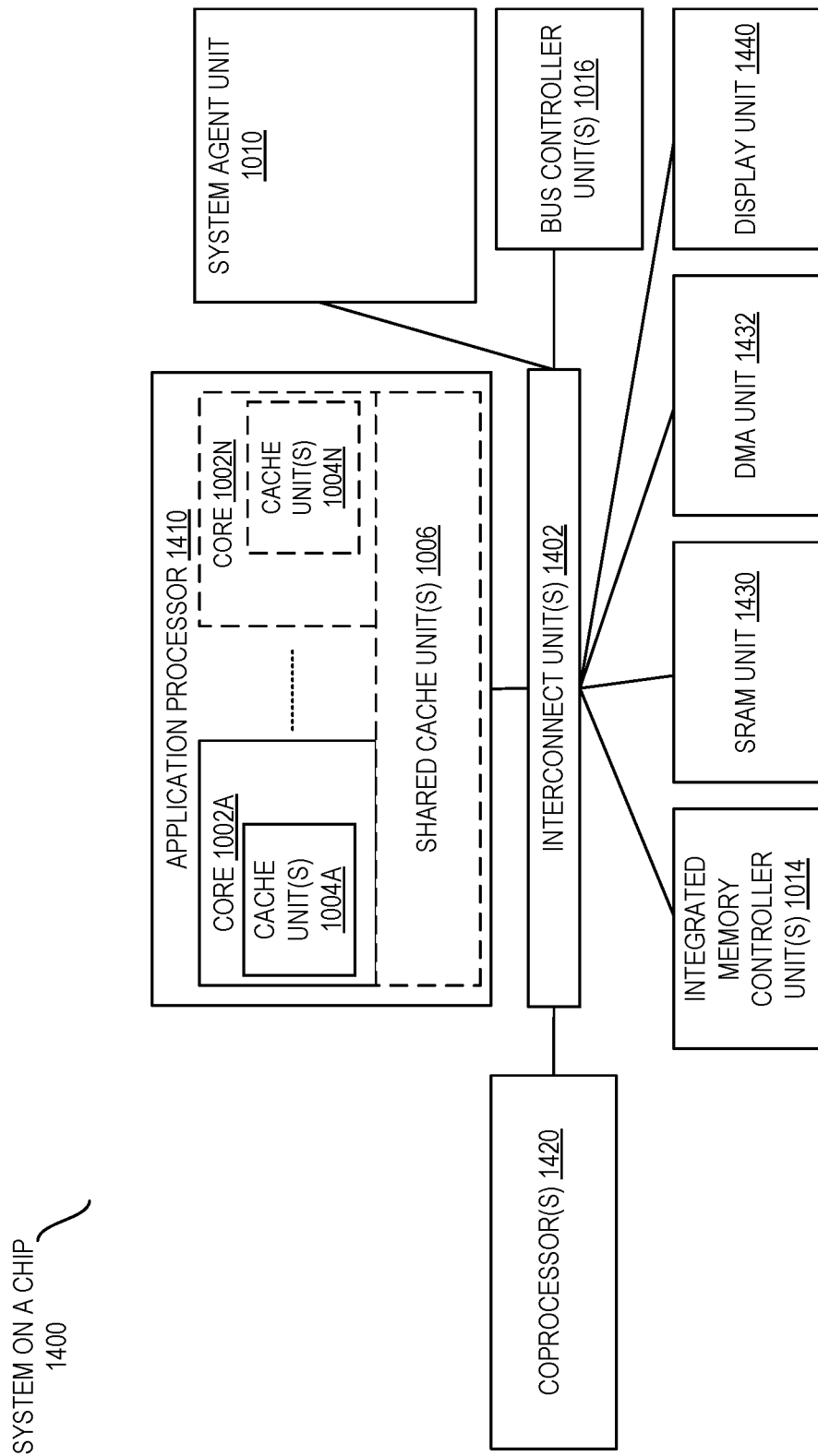
FIG. 14 is a block diagram of a SoC in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 1002A-N (including constituent cache units 1004A-N) and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make;

however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

The following examples pertain to further embodiments.

In one example, an apparatus includes: a control circuit to enable a comparison circuit based on a dynamic update to a hook table and a patch table; and the comparison circuit coupled to the control circuit to compare an address of a program counter to at least one address stored in the hook table, and in response to a match between the address of the program counter and the at least one address stored in the hook table, cause a jump from code stored in a ROM to patch code stored in a patch storage.

In an example, in response to the match, the comparison circuit is to update the program counter to a second address, the second address obtained from the patch table and corresponding to an entry point to the patch code.

In an example, the comparison circuit is to obtain an index from an entry of the hook table having the matching at least one address and access an entry of the patch table according to the index, the entry of the patch table having the second address.

In an example, the control circuit is to activate the comparison circuit in response to an enablement of a comparison register, the comparison register to be enabled based on the dynamic update to the hook table and the patch table.

In an example, the hook table comprises a first plurality of entries each to store a hook address at which an update to the code is to occur and having an index, and the patch table comprises a second plurality of entries each to store a patch address in the patch storage at which an update to the code is stored and having an index.

In an example, the apparatus further comprises: at least one execution circuit; and the ROM to store a plurality of functions to be executed by the at least one execution circuit.

In an example, the ROM is to store a first function, the first function including a header to call a first activation code block stored in the patch storage, where the first activation code block includes information to cause a dynamic update to the hook table and the patch table when update code for the first function is stored in the patch storage.

In an example, the header comprises an activation instruction of an instruction set architecture to cause execution to jump from first code of the first function stored in the ROM to patch code of the first function stored in the patch storage.

In an example, the apparatus further comprises a plurality of registers to store the hook table and the patch table, where the comparison circuit is to access at least some of the plurality of registers to identify the match between program counter address and the at least one address stored in the hook table.

In another example, a method comprises: in response to a first activator of a first function stored in a ROM, determining whether to populate a hook table and a patch table for the first function; in response to determining to populate the hook table and the patch table, dynamically loading one or more hook addresses for the first function into the hook table and dynamically loading one or more patch addresses for the first function into the patch table; and enabling a comparison circuit to execute during the first function to compare a program counter to hook addresses stored in the hook table.

In an example, the method further comprises in response to identifying a match between the program counter and a first one of the hook addresses stored in a first entry of the hook table, updating the program counter to a second address, the second address obtained from a first patch address stored in the patch table at an entry having an index corresponding to an index of the first entry of the hook table.

In an example, the method further comprises: executing first code of the first function stored in the ROM; and jumping from the first code to second code of the first function stored in a patch memory, the second code beginning at an address of the updated program counter.

In an example, the method further comprises, in response to the first activator of the first function, jumping to first activator code stored in a patch memory to obtain the one or more patch addresses and the one or more hook addresses.

In an example, the method further comprises: in response to the first activator of the first function, accessing an enable mask to determine whether to populate the hook table and the patch table; and in response to determining to populate the hook table and the patch table, obtaining the one or more hook addresses and the one or more patch addresses from a data memory.

In an example, the method further comprises: in response to a second activator of a second function stored in the ROM, determining to not populate the hook table and the patch table; and not enabling the comparison circuit to execute during the second function.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, an apparatus comprises: a ROM to store embedded code; a RAM to store patch code for the embedded code; a hook table having a plurality of hook entries each to identify a location within the embedded code at which a jump to the patch code is to occur; a patch table having a plurality of patch entries each to identify a starting address of a portion of the patch code; a control circuit to dynamically load at least some of the plurality of hook entries into the hook table, dynamically load at least some of the plurality of patch entries into the patch table and dynamically enable a comparison circuit, in response to an indication that the RAM includes the patch code for the embedded code around a vicinity of a portion of the embedded code in execution; the comparison circuit, when dynamically enabled, to compare an address of a program counter to the plurality of hook entries of the hook table, and in response to a match between the address of the program counter and one of the plurality of hook entries, cause the program counter to be updated to an updated address corresponding to a beginning of a portion of the patch code stored in the RAM; and at least one processor to execute at least a portion of the embedded code and the patch code.

In an example, the RAM comprises the hook table and the patch table.

In an example, the apparatus further comprises a plurality of registers to store at least a portion of the hook table and the patch table.

In an example, the control circuit is to access an enable mask to obtain the indication.

In an example, the embedded code comprises a plurality of functions, each of the plurality of functions including a header to call a first activation code block in the RAM, where the first activation code block includes one or more hook addresses to be dynamically loaded into the hook table and one or more patch addresses to be dynamically loaded into the patch table.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions and data.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a control circuit to dynamically enable a comparison circuit based on a dynamic update to a hook table and a patch table; and
the comparison circuit coupled to the control circuit to compare an address of a program counter to at least one address stored in the hook table, and in response to a match between the address of the program counter and the at least one address stored in the hook table, cause a jump from code stored in a read only memory (ROM) to patch code stored in a patch storage, wherein in response to the match, the comparison circuit is to update the program counter to a second address, the second address obtained from the patch table and corresponding to an entry point to the patch code and obtain an index from an entry of the hook table having the matching at least one address and access an entry of the patch table according to the index, the entry of the patch table having the second address.

2. The apparatus of claim 1, wherein the control circuit is to activate the comparison circuit in response to an enablement of a comparison register, the comparison register to be enabled based on the dynamic update to the hook table and the patch table.

3. The apparatus of claim 1, wherein:
the hook table comprises a first plurality of entries each to store a hook address at which an update to the code is to occur and having an index; and
the patch table comprises a second plurality of entries each to store a patch address in the patch storage at which an update to the code is stored and having an index.

4. The apparatus of claim 1, further comprising:
at least one execution circuit; and
the ROM to store a plurality of functions to be executed by the at least one execution circuit.

5. The apparatus of claim 4, wherein the ROM is to store a first function, the first function including a header to call a first activation code block stored in the patch storage, wherein the first activation code block includes information to cause a dynamic update to the hook table and the patch table when update code for the first function is stored in the patch storage.

6. The apparatus of claim 5, wherein the header comprises an activation instruction of an instruction set architecture (ISA) to cause execution to jump from first code of the first function stored in the ROM to patch code of the first function stored in the patch storage.

7. The apparatus of claim 1, further comprising a plurality of registers to store the hook table and the patch table, wherein the comparison circuit is to access at least some of the plurality of registers to identify the match between the program counter address and the at least one address stored in the hook table.

8. At least one non-transitory computer readable storage medium having stored thereon instructions, which if performed by a machine cause the machine to perform a method comprising:
in response to a first activator of a first function encountered during execution of the first function, the first function stored in a read only memory (ROM), determining whether to populate a hook table and a patch table for the first function;
in response to determining to populate the hook table and the patch table, dynamically loading one or more hook addresses for the first function into the hook table and dynamically loading one or more patch addresses for the first function into the patch table; and
dynamically enabling a comparison circuit to execute during the first function to compare a program counter to hook addresses stored in the hook table.

9. The non-transitory computer readable storage medium of claim 8, wherein the method further comprises in response to identifying a match between the program counter and a first one of the hook addresses stored in a first entry of the hook table, updating the program counter to a second address, the second address obtained from a first patch address stored in the patch table at an entry having an index corresponding to an index of the first entry of the hook table.

10. The non-transitory computer readable storage medium of claim 9, wherein the method further comprises:
   executing first code of the first function stored in the ROM; and
   jumping from the first code to second code of the first function stored in a patch memory, the second code beginning at an address of the updated program counter.

11. The non-transitory computer readable storage medium of claim 8, wherein the method further comprises, in response to the first activator of the first function, jumping to first activator code stored in a patch memory to obtain the one or more patch addresses and the one or more hook addresses.

12. The non-transitory computer readable storage medium of claim 8, wherein the method further comprises:
   in response to the first activator of the first function, accessing an enable mask to determine whether to populate the hook table and the patch table; and
   in response to determining to populate the hook table and the patch table, obtaining the one or more hook addresses and the one or more patch addresses from a data memory.

13. The non-transitory computer readable storage medium of claim 8, wherein the method further comprises:
   in response to a second activator of a second function stored in the ROM, determining to not populate the hook table and the patch table; and
   not enabling the comparison circuit to execute during the second function.

14. An apparatus comprising:
   a read only memory (ROM) to store embedded code;
   a random access memory (RAM) to store patch code for the embedded code;
   a hook table having a plurality of hook entries each to identify a location within the embedded code at which a jump to the patch code is to occur;
   a patch table having a plurality of patch entries each to identify a starting address of a portion of the patch code;
   a control circuit to dynamically load at least some of the plurality of hook entries into the hook table, dynamically load at least some of the plurality of patch entries into the patch table and dynamically enable a comparison circuit, in response to an indication that the RAM includes the patch code for the embedded code around a vicinity of a portion of the embedded code in execution;
   the comparison circuit, when dynamically enabled, to compare an address of a program counter to the plurality of hook entries of the hook table, and in response to a match between the address of the program counter and one of the plurality of hook entries, cause the program counter to be updated to an updated address corresponding to a beginning of a portion of the patch code stored in the RAM; and
   at least one processor to execute at least a portion of the embedded code and the patch code.

15. The apparatus of claim 14, wherein the RAM comprises the hook table and the patch table.

16. The apparatus of claim 14, further comprising a plurality of registers to store at least a portion of the hook table and the patch table.

17. The apparatus of claim 14, wherein the control circuit is to access an enable mask to obtain the indication.

18. The apparatus of claim 14, wherein the embedded code comprises a plurality of functions, each of the plurality of functions including a header to call a first activation code block in the RAM, wherein the first activation code block includes one or more hook addresses to be dynamically loaded into the hook table and one or more patch addresses to be dynamically loaded into the patch table.

\* \* \* \* \*